(12) United States Patent
Burke et al.

(10) Patent No.: US 6,701,057 B2
(45) Date of Patent: Mar. 2, 2004

(54) METHOD AND APPARATUS FOR SEPARATING TWO OPTICAL FIBERS

(75) Inventors: Patrick J. Burke, Corning, NY (US); William J. Miller, Horseheads, NY (US); Mark L. Morrell, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/153,234

(22) Filed: May 21, 2002

(65) Prior Publication Data

US 2003/0219221 A1 Nov. 27, 2003

(51) Int. Cl.[7] .................................................. G02B 6/00
(52) U.S. Cl. ....................... 385/147; 385/134; 385/136; 65/377
(58) Field of Search .............................. 385/24, 27, 16, 385/122, 136, 147, 134; 65/377, 409

(56) References Cited

U.S. PATENT DOCUMENTS

| | | |
|---|---|---|
| 4,902,324 A | 2/1990 | Miller et al. |
| 4,979,972 A | 12/1990 | Berkey et al. |
| 5,011,251 A | 4/1991 | Miller et al. ................... 385/43 |
| 5,240,489 A * | 8/1993 | Robson ........................ 65/409 |
| 5,251,276 A | 10/1993 | Berkey et al. ................. 385/43 |
| 5,268,014 A | 12/1993 | Miller et al. |
| 5,386,490 A * | 1/1995 | Pan et al. .................... 385/134 |
| RE35,138 E | 1/1996 | Weidman ...................... 385/42 |
| 6,092,394 A | 7/2000 | Backer et al. ................ 65/377 |

* cited by examiner

Primary Examiner—Phan T. H. Palmer
(74) Attorney, Agent, or Firm—Eric M. Smith; James V. Suggs; Svetlana Z. Snort

(57) ABSTRACT

A method and apparatus for separating a first and second optical fibers including a fiber feed mechanism adapted to feed the first optical fiber and the second optical fiber, and a nozzle adapted to provide a displacing force on the second optical fiber, where the second optical fiber is displaced away from the first optical fiber to thereby separate the second optical fiber from the first optical fiber. In one embodiment, the displacing force is provided by a gas stream directed away from the nozzle while in another embodiment, the displacing force is directed towards the nozzle. In another embodiment, the apparatus includes a separation mechanism with a first guide, a second guide, a guide separator, and a deflector plate. In another embodiment, the apparatus includes a clamp mechanism with a first clamping pad having an offset extension that extends beyond an edge of a second clamp pad.

30 Claims, 9 Drawing Sheets

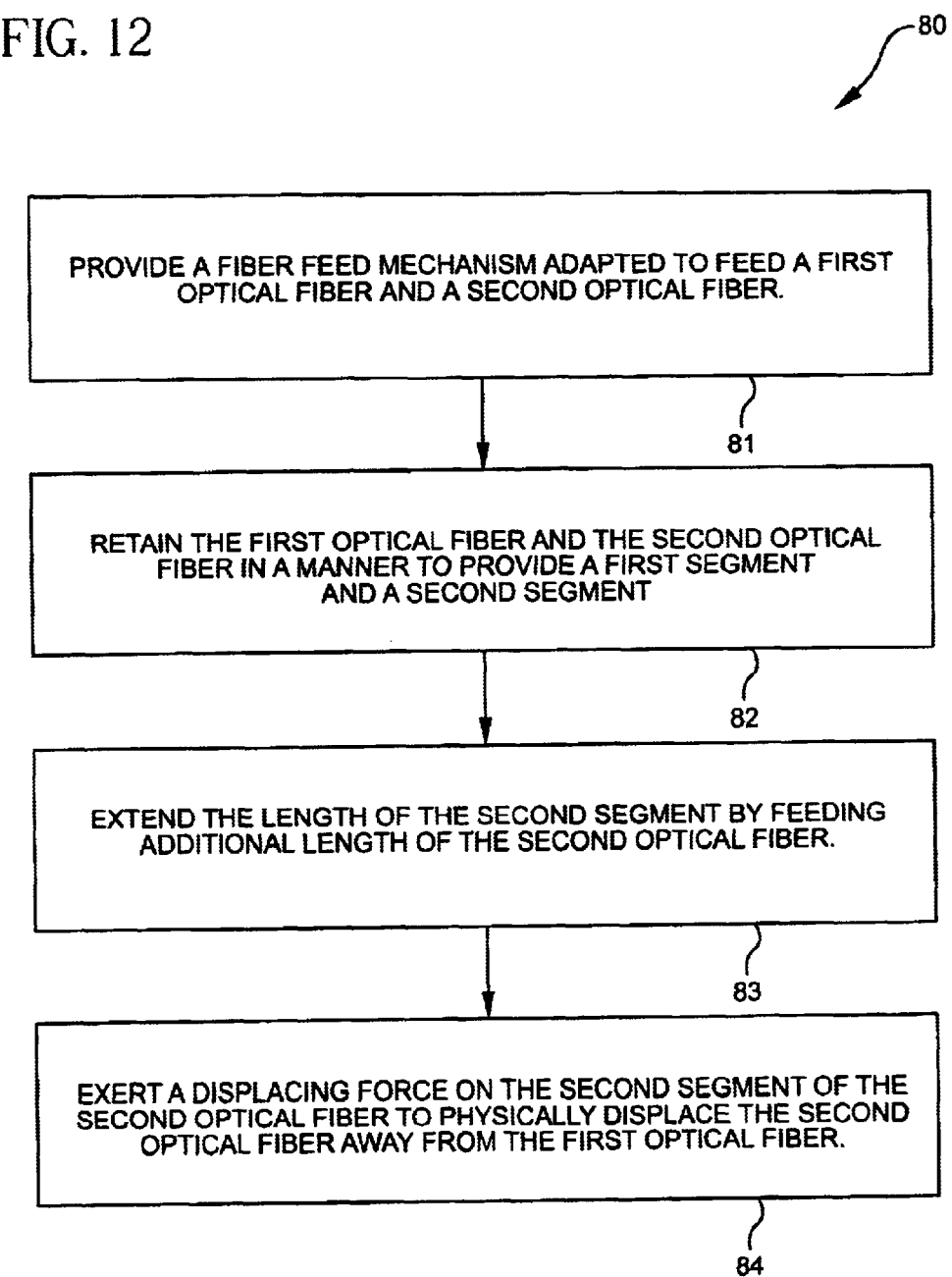

METHOD AND APPARATUS FOR SEPARATING TWO OPTICAL FIBERS

BACKGROUND OF THE INVENTION

1. Field of the Invention

The present invention is directed to automated manufacturing of fiber optic components. More specifically, the present invention is directed to apparatus and methods for processing two or more optical fibers.

2. Description of Related Art

During processing and manufacture of optical components such as overclad fiber optic couplers, two or more optical fibers need to be conveyed parallel and in close proximity to one another. More specifically, overclad fiber optic couplers are a type of fused fiber coupler wherein the coupling region is enclosed within a layer of matrix glass. To form an overclad fiber optical coupler, the stripped portions of a plurality of fibers are inserted into the bore of a glass capillary tube to form a coupler preform. The tube bore typically has enlarged funnel-shaped end portions that facilitate the insertion of optical fibers. The mid region of the coupler preform is heated to collapse the glass tube onto the fibers and then, the coupler preform is stretched until the desired coupling characteristics are obtained. Various types of overclad fiber optic couplers and methods of making such couplers are disclosed in U.S. Pats. No. Re. 35,138, U.S. Pat. Nos. 4,902,324, 4,979,972, 5,011,251, 5,251,276 and 5,268,014. To manufacture such optical couplers, regions of the optical fibers have to be stripped and inserted into the tube forming a coupler preform. A portion of the coupler preform is heated and collapsed onto the stripped portion of the optical fibers. The collapsed portion of the preform is then drawn to form a coupling region between the optical fibers. After the optical coupler has been formed by stretching the overclad tube and fibers, a glue such as an ultraviolet (UV) curable epoxy is inserted into the uncollapsed ends of the glass tube bore to provide the fibers with pull strength.

To facilitate manufacture of such optical components, an improved apparatus and manufacturing method has been disclosed in U.S. Pat. No. 6,092,394 to Backer et al. which discloses an automated manufacturing process for fiber optic couplers. In this regard, the apparatus disclosed in Backer et al. utilizes fiber feed mechanisms to route optical fibers to various processing stations. For instance, a plurality of optical fibers are fed to a station that strips a protective coating from a portion of one or more of the optical fibers. The optical fibers are also fed through the bore of the glass tube and the stripped portions of the optical fibers precisely positioned relative to one another to provide the coupler preform described. After the coupler preform is formed it is heated and drawn to form the fiber optic coupler. In order to precisely position the stripped portions of the optical fibers in the bore of the glass tube, the disclosed fiber feed mechanism allows feeding of the optical fibers independently from one another. It has been found that better quality couplers can be made at a greater rate and with more consistency using the invention of Backer et al., than can be made by the aforementioned manual process.

However, as described in further detail herein below, several limitations have been found by the present inventors in the apparatus and method disclosed in Backer et al. which limit the automation capacity of the disclosed apparatus and method.

SUMMARY OF THE INVENTION

In using the apparatus and method disclosed in Backer et al., the present inventors have found that occurrences of misfeed or other mishandling of one or more of the optical fibers occurred due to their proximity of the optical fibers to one another. In particular, the present inventors found that due to the close proximity of a plurality of optical fibers to one another during optical fiber processing or optical component manufacturing, the fibers have a tendency to cling to one another. The clinging of optical fibers to one another makes it difficult to feed the ends of each of the optical fibers to the desired location or proper position. For example, due to the clinging of optical fibers, each fiber may be improperly fed to a wrong roller in a subsequent fiber feed mechanism. When this occurs, the optical coupler manufacturing process is interrupted and an operator must manually correct the situation by pulling the misfed optical fiber out and feeding it to the proper location or position.

Furthermore, the close proximity of the optical fibers to one another has also posed another difficulty in fully automating the manufacture of overclad fiber optic couplers. In particular, because a portion of one or more of the fibers need to be stripped as previously described, the optical fiber to be stripped needs to be separated from the rest of the fibers. Otherwise, when the protective coating is removed using a hot, gaseous stripping medium, the hot stripping medium such as nitrogen gas impinges on the other fibers thereby stripping the protective outer covering at improper locations on these optical fibers.

In view of the foregoing, the present invention has the advantage of providing a reliable apparatus and method for separating a first optical fiber from a second optical fiber.

Another advantage of the present invention is in providing such an apparatus and method which will allow proper feeding of a fiber end to a desired location or position for further processing.

Still another advantage of the present invention is in providing such an apparatus and method which will allow separation of the second fiber away from the first fiber that is to be stripped.

In accordance with one embodiment of the present invention, an apparatus for separating a first optical fiber from a second optical fiber is provided, the apparatus including a fiber feed mechanism adapted to feed the first optical fiber and the second optical fiber, and a nozzle adapted to provide a displacing force on the second optical fiber, where the second optical fiber is displaced away from the first optical fiber thereby separating the second optical fiber from the first optical fiber. In accordance with one embodiment, the displacing force is directed away from the nozzle while in another embodiment, the displacing force is directed towards the nozzle. The displacing force is provided by a gas stream in one embodiment. The fiber feed mechanism in accordance with one embodiment is further adapted to selectively feed the first optical fiber and the second optical fiber independently of each other.

In accordance with another embodiment of the present invention, the apparatus for separating a first optical fiber from a second optical fiber further includes a separation mechanism positioned a spaced distance from the fiber feed mechanism in a manner that the nozzle is positioned between the fiber feed mechanism and the separation mechanism, the separation mechanism including a first guide and a second guide spaced apart from one another, where the first and second guides receive the first and second optical fibers respectively. A guide separator is further provided between the first guide and a second guide in accordance with one embodiment. In addition, in another embodiment, the displacing force is exerted on a tip portion of the second optical fiber prior to the second optical fiber being received in the second guide. In this regard, the nozzle is positioned proximate to the separation mechanism in a manner that the displacing force displaces the tip of the second optical fiber towards the second guide to allow insertion of the second optical fiber into the second guide. In one embodiment, a deflector plate positioned to limit the displacement of the tip of the second optical fiber is also provided, the deflector plate including a vent opening including a plurality of through holes. The deflector plate is further adapted in another embodiment to guide the tip of the second optical fiber into the second guide and includes a concave surface.

In still another embodiment, the apparatus further includes a retainer where a first segment of the first optical fiber and a second segment of the second optical fiber are retained between the fiber feed mechanism and the retainer, length of at least the second segment being extendible by feeding additional length of the second optical fiber via the fiber feed mechanism. In this regard, the retainer of one embodiment is a clamp mechanism having a first clamp pad and a second clamp pad, at least one of the first and second clamp pads being transversely displaceable relative to the other to allow clamping of the first optical fiber and the second optical fiber thereinbetween. Preferably, the first clamping pad includes an offset extension that extends beyond an edge of the second clamp pad in a manner to predispose the second segment of the second optical fiber away from the offset extension when the second optical fiber is clamped in the clamp mechanism and extended via the fiber feed mechanism. Moreover, the displacing force acts on a mid portion of the second segment as the second optical fiber is extended via the fiber feed mechanism.

In accordance with another aspect of the present invention, a method for separating a first optical fiber from a second optical fiber is provided including the steps of providing a fiber feed mechanism adapted to feed the first optical fiber and the second optical fiber in a manner that the first optical fiber and the second optical fiber are parallel to one another, and exerting a displacing force on the second optical fiber to physically displace the second optical fiber away from the first optical fiber to thereby separate the second optical fiber from the first optical fiber. In accordance with one embodiment, the displacing force is provided by impinging a gas stream on the second optical fiber. In one embodiment of the present method, the fiber feed mechanism is further adapted to selectively feed the first optical fiber and the second optical fiber independent of each other.

In accordance with another embodiment, the present method also includes the step of inserting the first optical fiber into a first guide and inserting the second optical fiber into a second guide, the first guide being spaced apart from the second guide. In this regard, the present method also includes the step of displacing a tip portion of the second optical fiber towards the second guide prior to the step of inserting the second optical fiber into the second guide. Moreover, the present method of another embodiment further includes the steps of inserting the first optical fiber into the first guide before exerting the displacing force on the tip portion of the second optical fiber. In accordance with still another embodiment, the present invention further includes the step of limiting displacement of the tip of the second optical fiber by providing a deflector plate that limits physical displacement of the tip of the second optical fiber.

Yet another embodiment of the present method further includes the steps of retaining the first optical fiber and the second optical fiber in a manner to provide a first segment of the first optical fiber and a second segment of the second optical fiber, and extending length of at least the second segment by feeding additional length of the second optical fiber via the fiber feed mechanism. In accordance with one preferred embodiment, the step of retaining the first optical fiber and the second optical fiber are attained by a clamp mechanism, the clamp mechanism including a first clamp pad and a second clamp pad, at least one of the first clamp pad and the second clamp pad being transversely displaceable relative to the other to allow clamping of the first optical fiber and the second optical fiber thereinbetween. In this regard, one embodiment further includes the step of providing the displacement force on a mid portion of the second segment as the second segment is extended via the fiber feed mechanism. The step of maintaining the extended second segment away from the first segment is obtained in one embodiment by continually exerting the displacing force on the a mid portion of the second segment. In another embodiment, the first clamping pad includes an offset extension that extends beyond an edge of the second clamp pad in a manner to predispose the second segment of the second optical fiber away from the offset extension when the second optical fiber is clamped in the clamp mechanism.

These and other advantages and features of the present invention will become more apparent from the following detailed description of the preferred embodiments of the present invention when viewed in conjunction with the accompanying drawings.

BRIEF DESCRIPTION OF THE DRAWINGS

FIG. 12 is a flow diagram illustrating a method for separating a first optical fiber from a second optical fiber in accordance with another embodiment of the present invention.

DETAILED DESCRIPTION OF THE PREFERRED EMBODIMENT

Figure 1:
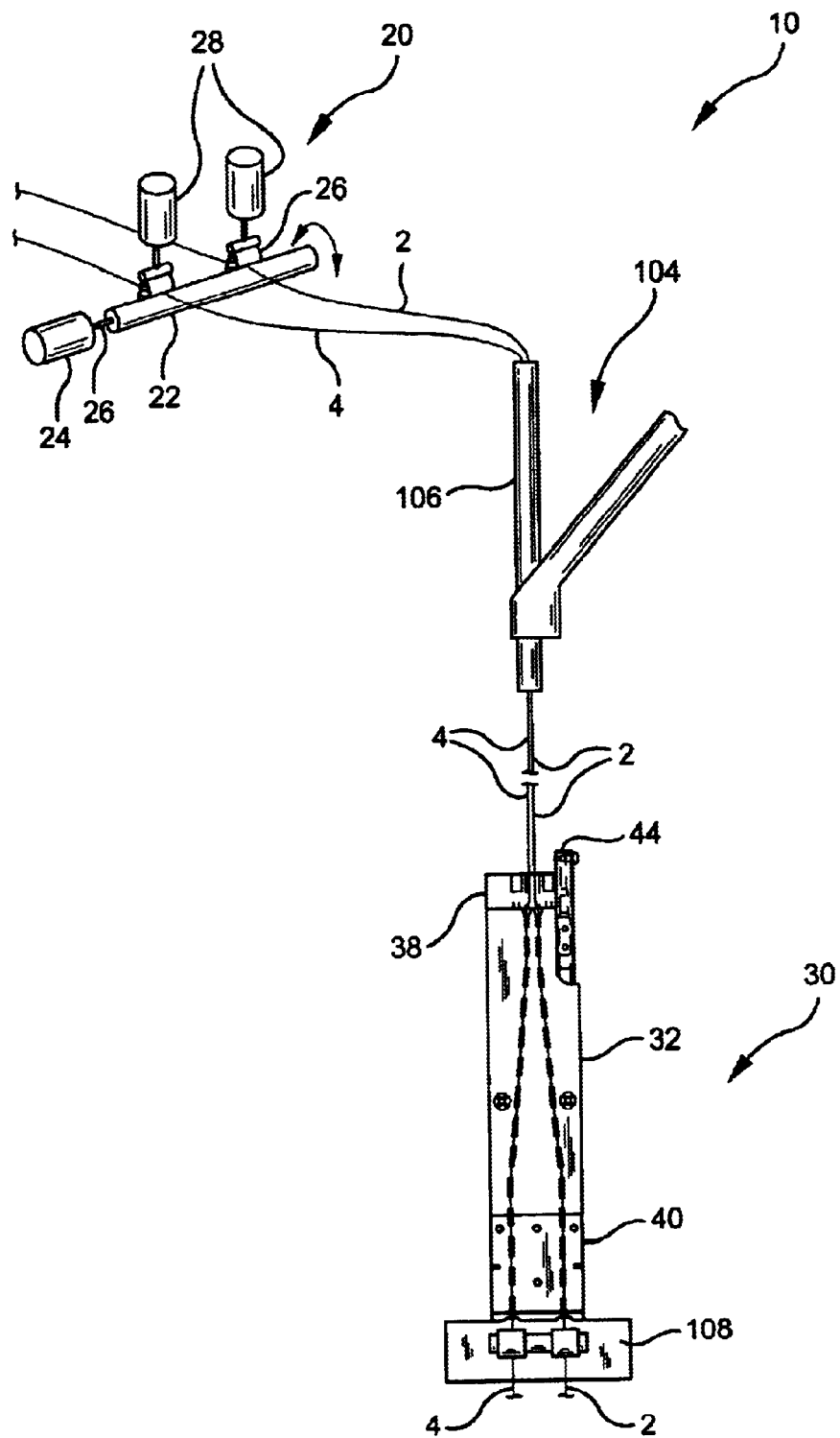
FIG. 1 is a schematic illustration of a separating apparatus for separating a first optical fiber from a second optical fiber in accordance with one embodiment of the present invention being used to separate optical fibers.

FIG. 1 is a schematic illustration of a separating apparatus 10 for separating two parallel optical fibers from one another in accordance with one embodiment of the present invention. As will be evident from the discussion herein below, the present invention provides a reliable apparatus and method for separating a first optical fiber 2 from a second optical fiber 4 to allow proper positioning of the second optical fiber 4. As can be seen in the embodiment of FIG. 1, the separating apparatus 10 includes a fiber feed mechanism 20 and a separation mechanism 30. The fiber feed mechanism 20 of the separating apparatus 10 is preferably adapted to feed the first optical fiber 2 and the second optical fiber 4 independently of one another. In this regard, the feed mechanism 20 in accordance with the illustrated embodiment includes a turned roller 22 driven by motor 24 and idler rollers 26 which are actuable via cylinders 28. When the cylinders 28 are actuated, the idler rollers 26 engage the turned roller 22 to thereby feed the optical fibers 2 and 4 through a support arm 106 of the fiber insertion apparatus 104, only portion of which is shown. As can be appreciated, each of the cylinders 28 are individually actuable so that feeding of the optical fibers 2 and 4 can be controlled independently from one another. Of course, the illustrated embodiment shows merely one example of the feed mechanism 20 and other feed mechanisms are usable as well in other embodiments. For example, whereas the fiber feed mechanism 20 is adapted to feed both the first optical fiber 2 and the second optical fiber 4 independently of each other, two separate feed mechanisms are usable in other embodiments to control the feeding of the first and second optical fibers.

In the illustrated embodiment of FIG. 1, the feed mechanism 20 of the separating apparatus 10 is used to feed the optical fibers 2 and 4 through a support arm 106 of the fiber insertion apparatus 104, through the separation mechanism 30, and to another feed mechanism 108. However, it should be noted that the optical fibers 2 and 4, the fiber insertion apparatus 104 and the second feed mechanism 108 are actually not part of the separating apparatus 10 in accordance with the present invention but are merely illustrated to provide a context in which the separating apparatus 10 can be used in optical fiber processing.

In this regard, the fiber insertion apparatus 104 is used to insert ends of the optical fibers 2 and 4 into a glass tube (not shown) for making an optical coupler or other optical component in a manner disclosed in U.S. Pat. No. 6,092,394 to Backer et al. prior to feeding of the optical fibers 2 and 4 into the separation mechanism 30. Because the optical fibers 2 and 4 are placed in close proximity to one another when they are fed into the glass tube, they have a tendency to cling to one another. This makes it very difficult to properly feed the optical fibers 2 and 4 to a desired location for further processing as previously described. For instance, in the illustrated application of FIG. 1, the optical fibers 2 and 4 are to be fed to another feed mechanism 108 which is adapted to feed these fibers individually in a manner similar to the feed mechanism 20 discussed above. This requires that the optical fibers 2 and 4 be separated so that they are properly fed to the corresponding rollers of the feed mechanism 108. The separating apparatus 10 as described in further detail below and in particular, the separation mechanism 30 allows such separation to occur.

Of course, in other embodiments, the two parallel optical fibers 2 and 4 can be separated for other purposes as well and need not be for proper feeding of each of the optical fibers to a corresponding roller of a feed mechanism 108. Thus, the separating apparatus 10 can be used in any other optical fiber application where separation of two or more optical fibers is desirable. FIG. 1 illustrates merely one application of the separating apparatus 10 and the present invention should not be limited thereto. In addition, it should also be noted that whereas a specific application of the present invention is shown where two optical fibers are separated from one another, the present invention is also readily applicable to other applications where more than two optical fibers are separated from one another.

Figure 2:
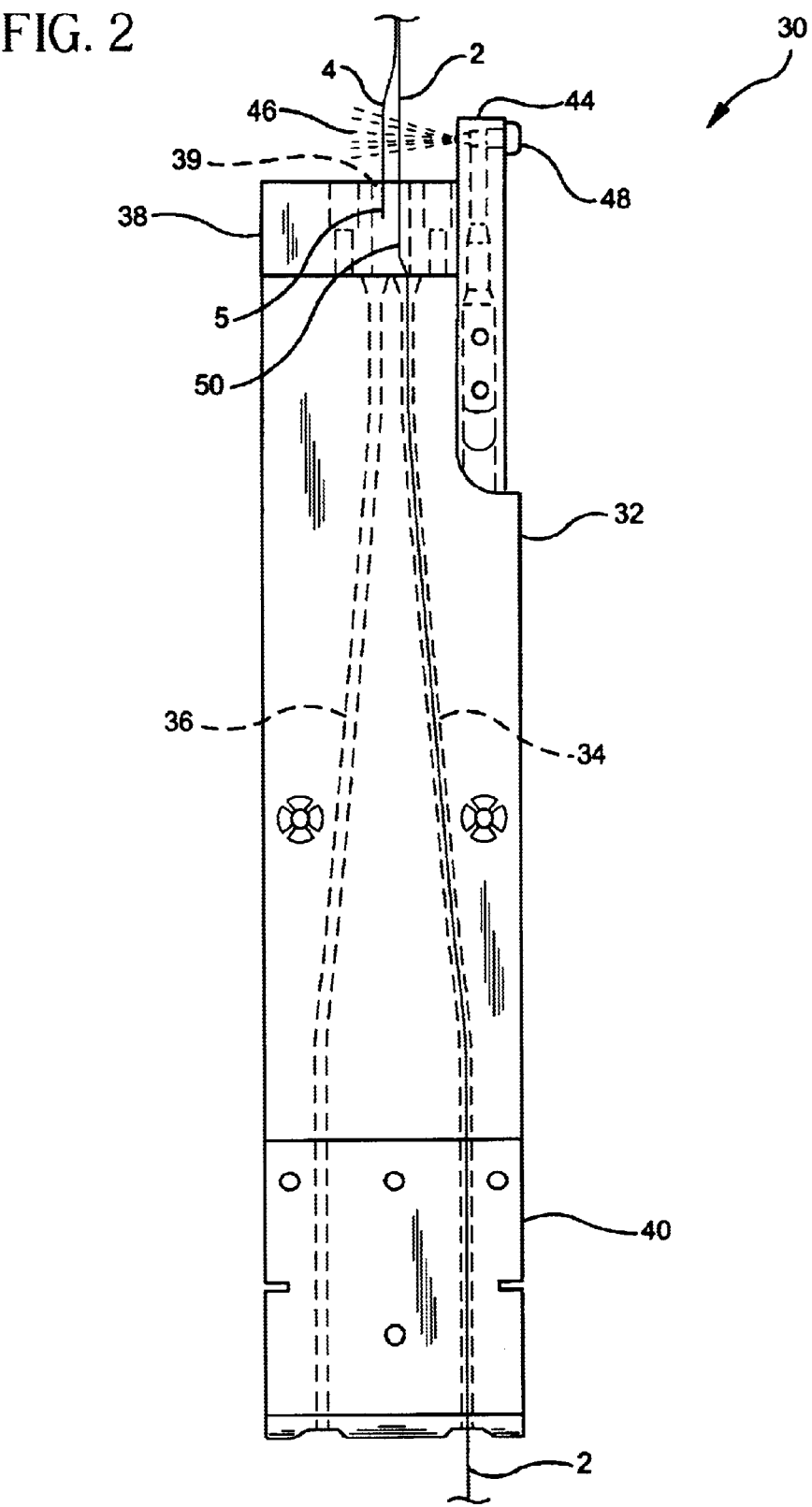
FIG. 2 is an enlarged view of the separation mechanism of FIG. 1 in accordance with one embodiment of the present invention.
Figure 3:
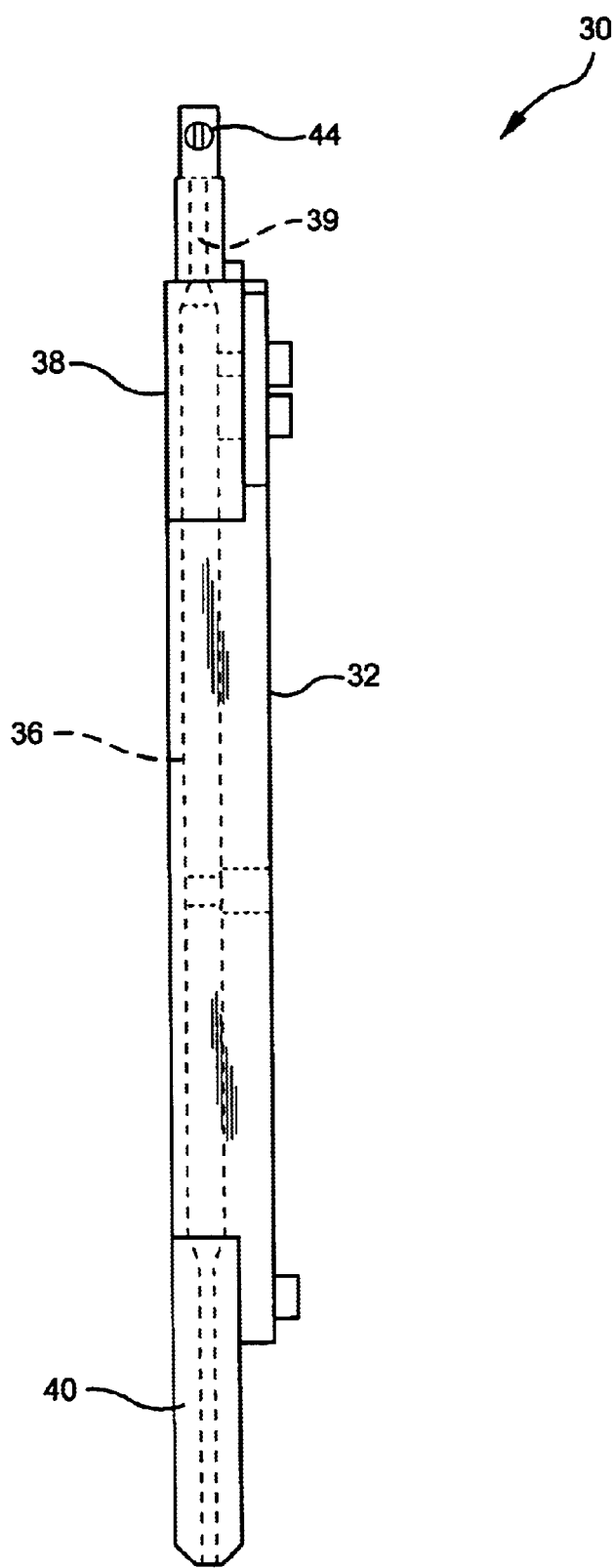
FIG. 3 is a side view of the separation mechanism of FIG. 2.

FIGS. 2 and 3 show various enlarged views of the separation mechanism 30 of the illustrated embodiment of the separating apparatus 10 of FIG. 1. In this regard, FIG. 2 shows a tip of the second optical fiber 4 being fed into the separation mechanism 30 while FIG. 3 does not show either of the optical fibers. The separation mechanism 30 of the illustrated embodiment includes a body portion 32 having a first guide 34 adapted to guide the first optical fiber 2 and a second guide 36 adapted to guide the second optical fiber 4. The separation mechanism 30 of the illustrated embodiment also includes a fiber entry portion 38 and an exit portion 40 which have been made as separate components and secured to the body portion 32 to reduce manufacturing costs.

As can be seen in these figures, the separating apparatus 10 for separating a first optical fiber 2 from a second optical fiber 4 also includes a nozzle 44 which is adapted to provide a displacing force to thereby separate the two optical fibers 2 and 4. As can be seen in FIG. 1, the nozzle 44 is positioned between the fiber feed mechanism 20 and the fiber separation mechanism 30. In this regard, in the present embodiment, the nozzle 44 is mounted directly to the body portion 32 of the separation mechanism 30. However, it should be noted that in other embodiments, the nozzle 44 is mountable in other locations as well and need not be directly mounted to the separation mechanism 30.

In the illustrated embodiment, the displacing force is provided by a gas stream 34 directed away from the nozzle 44, the gas stream 34 being compressed air or other gas. As can be most clearly seen in FIG. 2, the first and second optical fibers 2 and 4 tend to cling to each other due to their close proximity as discussed previously. To separate these optical fibers, the first optical fiber 2 is initially fed independent from the second optical fiber 4 through the fiber entry portion 38 via opening 39, through the first guide 33 of the body portion 32, and through the exit portion 40. The first optical fiber 2 is then retained in position by a mechanism such as the feed mechanism 108 shown in FIG. 1.

Then, the second optical fiber 4 is fed independently from the first optical fiber 2. As the tip 5 of the second optical fiber 4 approaches the fiber entry portion 38 or shortly after the tip 5 enters the opening 39 of the fiber entry portion 38, a displacement force is exerted on the tip 5 of the second optical fiber 4 thereby separating the second optical fiber 4 from the first optical fiber 2 in the manner most clearly shown in FIG. 2. In particular, a gas stream 46 of compressed air or other gas is provided through the nozzle 44 from a compressor (not shown) so that the gas stream 46 impinges on the tip 5 of the second optical fiber 4 thereby separating the tip 5 of the second fiber 4 from the first optical fiber 2. The second optical fiber 4 is then fed by the feed mechanism 20 shown in FIG. 1 so that the second optical fiber 4 is properly fed through the fiber entry portion 38 and into the second guide 36 due to the displacement force exerted by the gas stream 46. In this manner, the second optical fiber 4 is fed to the second guide 36 instead of being fed to the first guide 34. To ensure proper displacement of the tip 5 of the second optical fiber 4, the displacement force is made adjustable in the illustrated embodiment of the nozzle 44 by turning an adjustment screw 48 shown in FIG. 2 which allows control of the amount of gas stream 46 provided through the nozzle 44.

Figure 4:
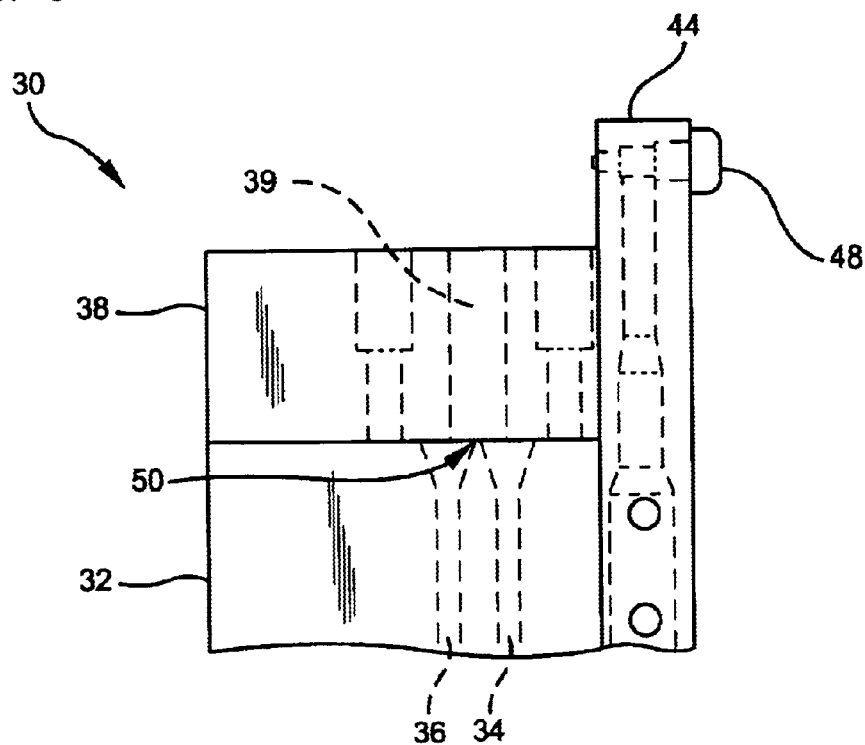
FIG. 4 is an enlarged view of the nozzle and a portion of the separation mechanism of FIG. 2.
Figure 5:
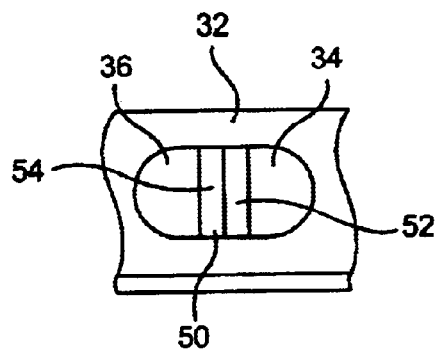
FIG. 5 is an enlarged downward view of the fiber guides and the guide separator in accordance with one embodiment of the present invention.

To further facilitate the proper feeding of the first optical fiber 2 into the first guide 34 and the second optical fiber 4 into the second guide 36, the body portion 32 is also provided with a guide separator 50 most clearly shown in FIGS. 4 and 5 that divides the first guide 34 and the second guide 36. The guide separator 50 provides tapered surfaces 52 and 54 which lead into the first guide 34 and second guide 36 respectively. As can be seen, the first guide 34 and the second guide 36 diverge further apart in the body portion 32 thereby further separating the first and second optical fibers 2 and 4. In the above described manner, the first and second optical fibers 2 and 4 are properly fed to the desired location or position. Again, in the illustrated embodiment, the first and second optical fibers 2 and 4 are properly fed to the respective idler rollers of the fiber feed mechanism 108 shown in FIG. 1. Of course, it is again noted that the fiber feed mechanism 108 is merely one example of how the present invention can be used.

It should be also noted that whereas in the presently discussed embodiments, the gas stream 46 is in the form of compressed air directed away from the nozzle 44, in another embodiment, the displacing force and the gas stream 46 is directed towards the nozzle 44 instead. This is readily attained using a vacuum (not shown) connected to the nozzle 44. In such an embodiment, the second optical fiber 4 would be initially fed through the separation mechanism 30 and retained. As the first optical fiber 2 is being fed, the gas stream 46 directed towards the nozzle 44 will cause the tip of the first optical fiber 2 to be separated from the second optical fiber 4 so that it is fed into the first guide 34. In addition, the displacing force caused by the gas stream 46 would also be adjustable using the adjustment screw 48.

Figure 6:
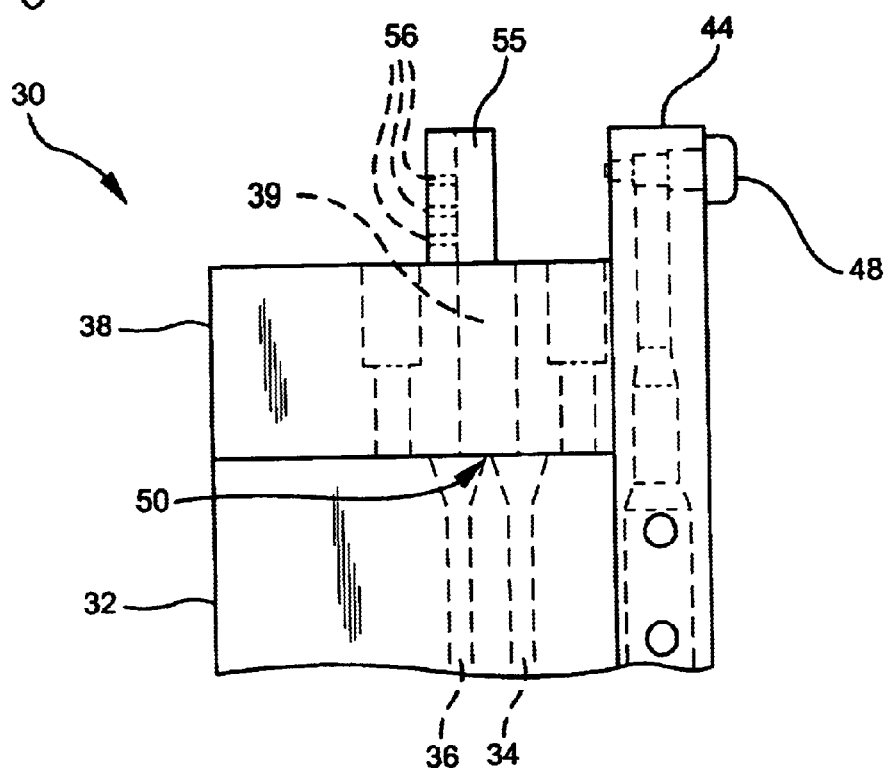
FIG. 6 is an enlarged view of the nozzle and a portion of the separation mechanism in accordance with another embodiment of the present invention.

FIG. 6 is an enlarged view of a nozzle 44 and separation mechanism 30' in accordance with another embodiment of the present invention which includes a deflector plate 55, the common elements being enumerated with the same numerals for clarity. In accordance with the illustrated embodiment, the deflector plate 55 is positioned opposite to the nozzle 44 to limit the displacement of the tip of the second optical fiber so that when the gas stream (not shown) impinges upon the tip of the second optical fiber, it is not displaced too far away from the opening 39 of the fiber entry portion 38. The deflector plate 55 preferably includes a plurality of through holes 56 that provides a vent opening for allowing the gas stream provided by the nozzle 44 to pass through the deflector plate 55.

Figure 7:
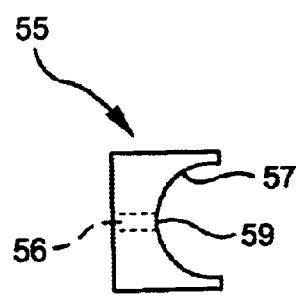
FIG. 7 is an enlarged downward view of the deflector plate shown in FIG. 6.

In addition, the deflector plate 55 further includes provisions that guide the tip of the second optical fiber into the second guide 36. In this regard, FIG. 7 shows an enlarged downward view of the deflector plate 55 clearly showing the concave surface 57 of the deflector plate 55 which is preferably sized and aligned with the opening 39 of the fiber entry portion 38 to provide a flush transition. As can be appreciated from FIG. 6, when the gas stream is provided, the tip of the second optical fiber is pressed against the deflector plate 55. Due to the concave surface 57, the tip of the second optical fiber is pushed to the furthest location on the concave surface 58, which in the illustrated embodiment, are where the through holes 56 are positioned. Since in the illustrated embodiment, the concave surface 57 is flushly aligned with the opening 39, the tip of the second optical fiber is readily fed into the opening 39 and into the second guide 36.

Figure 8:
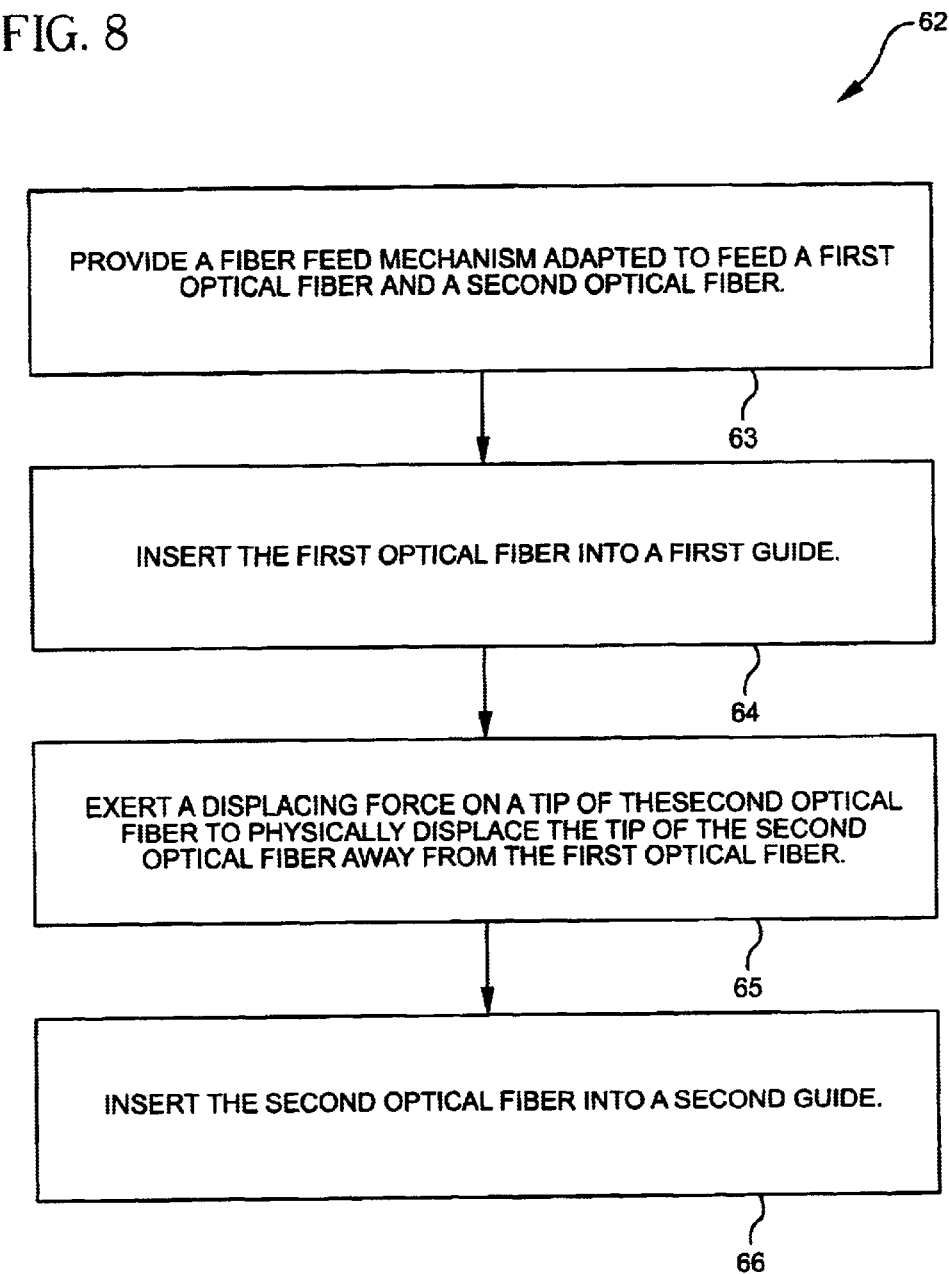
FIG. 8 is a flow diagram illustrating a method for separating a first optical fiber from a second optical fiber in accordance with one embodiment of the present invention.

In view of the above, it should now be evident that the present invention also provides a method for separating a first optical fiber from a second optical fiber. FIG. 8 shows a flow diagram 62 illustrating a method for separating a first optical fiber from a second optical fiber in accordance with one embodiment. In the illustrated embodiment, a fiber feed mechanism is provided which is adapted to feed the first optical fiber and the second optical fiber in step 64 so that the optical fibers are parallel to one another in step 63. The first optical fiber is inserted into a first guide in step 64. A displacing force is then exerted on a tip of the second optical fiber to physically displace the tip of the second optical fiber away from the first optical fiber in step 65. The second optical fiber is then inserted into a second guide in step 66 thereby separating the second optical fiber from the first optical fiber. Of course, it should be evident that the above noted steps of the method shown in flow diagram 62 are readily attained using the separating apparatus 10 discussed above relative to FIGS. 1 to 7.

Figure 9:
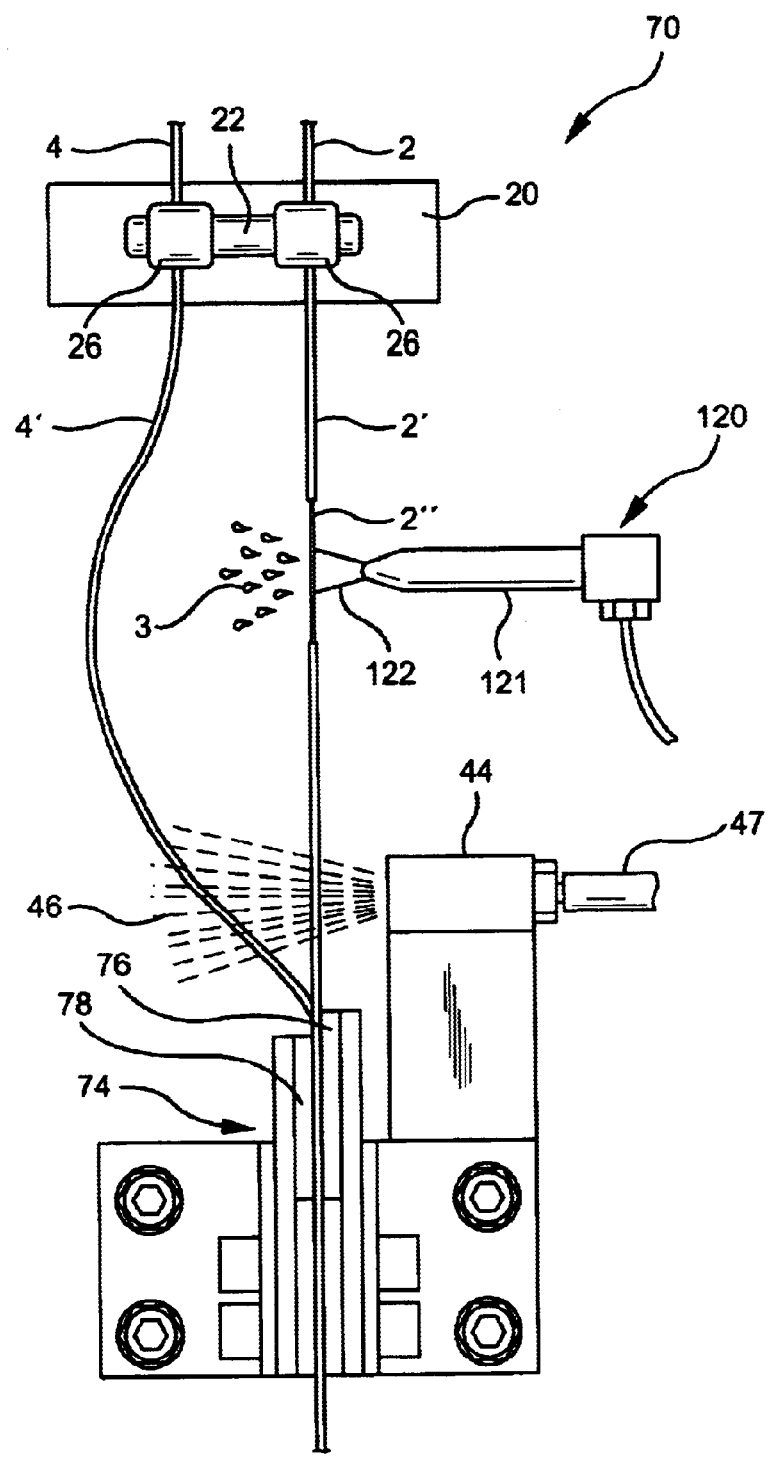
FIG. 9 is a schematic illustration of a separating apparatus for separating a first optical fiber from a second optical fiber in accordance with another embodiment of the present invention being used to separate optical fibers.

FIG. 9 illustrates a separating apparatus 70 for separating a first optical fiber 2 from a second optical fiber 4 in accordance with another embodiment of the present invention, the elements corresponding with the elements of the separating apparatus 10 discussed above being numbered with same numerals for clarity. As can be seen, the separating apparatus includes a feed mechanism 20, a retainer which is a clamp mechanism 74 in the present embodiment, and a nozzle 44 which are used in the manner described below to separate the two optical fibers.

As can be seen, he separating apparatus 70 is used in the present example to separate the first and second optical fibers to allow a portion of the first optical fiber 2 to be stripped using the stripper device 120 without stripping or damaging the second optical fiber 4 in the manner described further below. However, it should be appreciated that the optical fibers and stripper device 120 are not part of the present invention and in this regard, the separating apparatus 70 is usable in other optical fiber processing applications as well.

The illustrated embodiment of the feed mechanism 20 of the separating apparatus 70 includes a turned roller 22 and idler rollers 26 which engage the turned roller 22 to thereby feed the first and second optical fibers 2 and 4 independent from one another in the manner previously described. The first and second optical fibers 2 and 4 are fed and retained by the clamp mechanism 74 to thereby define a first segment 2' of the first optical fiber 2 and a second segment 4' of the second optical fiber 4 between the fiber feed mechanism 20 and the clamp mechanism 74 in the manner shown.

The length of the second segment 4' of the second optical fiber 4 is then extended by feeding additional length of the second optical fiber 4 via the fiber feed mechanism 20. Preferably at the same time or thereafter, the gas stream 46 is provided from the nozzle 44 in the direction away from the nozzle 44 which exerts a displacing force on the second optical fiber 4 to thereby cause the second segment 4' of the second optical fiber 4 to bow outwardly in the manner shown away from the first optical fiber 2. The gas stream 46 is preferably compressed air which is supplied through tubing 47. As can also be seen, in contrast to the separating apparatus 10 of the previous embodiment which provided the gas stream to a tip of the second optical fiber, the present embodiment of the separating apparatus 70 provides the gas stream 46 to a mid portion of the second segment 4' as the length of second segment 4' is extended via the fiber feed mechanism 20.

Once the second optical fiber 4 is displaced away from the first optical fiber 2, a portion of the first optical fiber 2 is stripped using the stripper device 120 which provides a stripping medium 122 such as hot inert gas through the stripper nozzle 121 that strips away the outer protective coating of the first optical fiber 2 to provide the stripped portion 2'. The outer protective coating is melted and blown away in droplets 3 which may be evacuated by a stripper exhaust device (not shown). The details of the stripping device 120 is already known in the art and thus, is not further detailed herein. The extended second segment 4' is maintained away from the first segment 2' by continually providing the gas stream 46 on the second segment 4' and thus, continually exerting the displacing force until the stripping operation is completed. In this manner, the separating device 70 in accordance with the illustrated embodiment separates the first optical fiber 2 and the second optical fiber 4 from one another and the first optical fiber 2 can be stripped using the stripper device 120 without damaging the second optical fiber 4.

Figure 10:
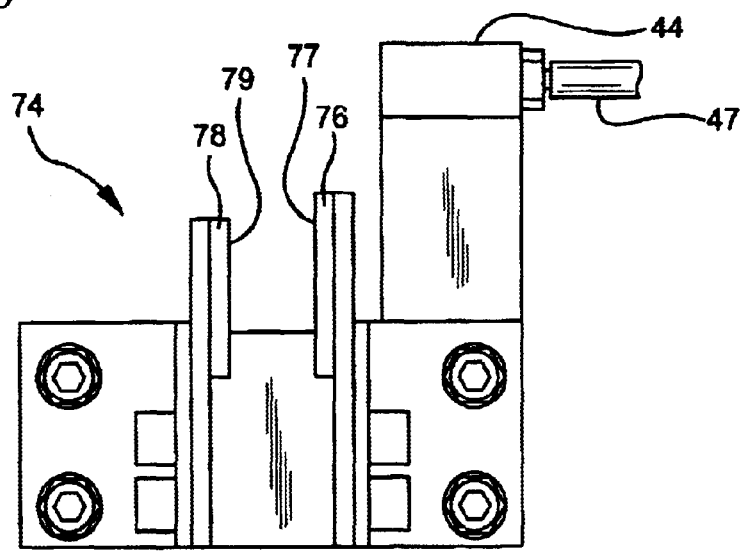
FIG. 10 is a front view of the clamp mechanism of FIG. 9.
Figure 11:
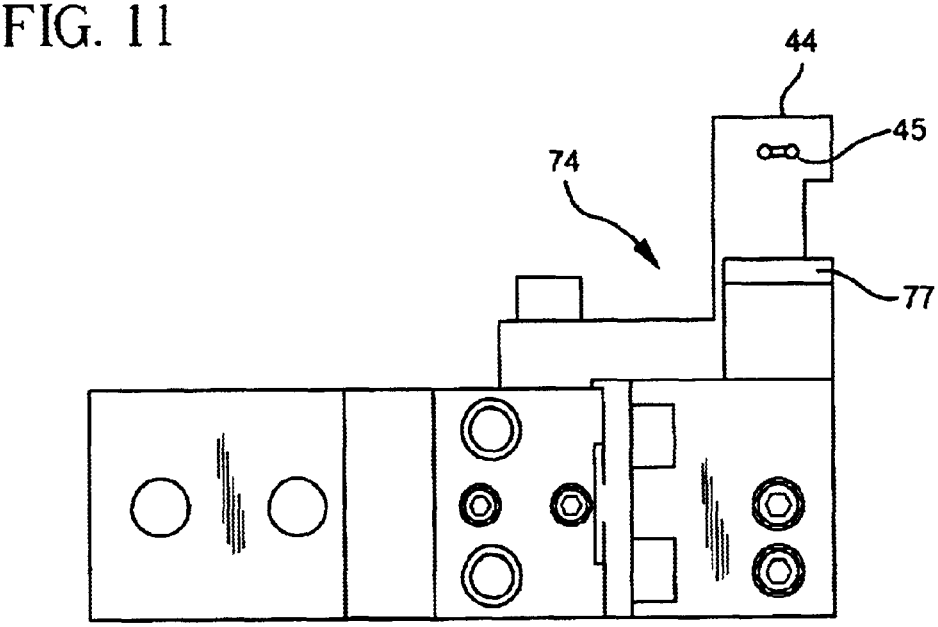
FIG. 11 is a side view of the clamp mechanism of FIG. 9.

FIGS. 10 and 11 show front and side views respectively of the clamp mechanism 74 of FIG. 9, together with the nozzle 44. As can be seen, the clamp mechanism 74 includes a first clamp pad 76 and a second clamp pad 78 which are transversely displaceable relative to the other to allow clamping of the first optical fiber 2 and the second optical fiber 4 therein between in the manner shown in FIG. 9. As most clearly shown in FIG. 11, the nozzle 44 includes openings 45 for providing the gas stream 46.

To further facilitate the separation of the first and second optical fibers 2 and 4, the first clamping pad 76 includes an offset extension 77 that extends beyond an edge 79 of the second clamp pad 78. When the first and second clamping pads 76 and 77 are transversely displaced together to clamp the optical fibers therein between, the offset extension 77 predisposes the optical fibers away from the offset extension 77. More specifically, the offset extension 77 limits the movement of the optical fibers clamped between the first and second clamping pads 76 and 77 in the direction of the offset extension 77 but does not limit movement in the direction away from the offset extension 77. Consequently, the optical fibers are predisposed to move away from the offset extension 77 so that when the length of the second segment 4' of the second optical fiber 4 is extended and the gas stream 46 is provided, the second optical fiber 4 is separated from the first optical fiber 2 in the manner shown in FIG. 9.

Therefore, in view of the above, it should also be apparent that the present invention also provides another method of separating the first optical fiber from the second optical fiber. In this regard, FIG. 12 shows a flow diagram 80 illustrating a method for separating a first optical fiber from a second optical fiber in accordance with the above described embodiment of the present invention. As can be seen, the method includes providing a fiber feed mechanism that is adapted to feed a first optical fiber and a second optical fiber in step 81. The first and second optical fibers are retained in a manner to provide a first segment of the first optical fiber and a second segment of the second optical fiber in step 82. In step 83, the length of the second segment is extended by feeding additional length of the second optical fiber. Finally, a displacing force is exerted on the second segment of the second optical fiber to separate the two optical fibers. Of course, it should also be evident that the above noted steps of the method shown in flow diagram 80 are readily attained using the separating apparatus 70 discussed above relative to FIGS. 9 to 11 such as by using the clamp mechanism 74 and the nozzle 44.

In view of the above discussion, it should now be apparent how the present invention provides methods and apparatus for separating a first optical fiber from a second optical fiber. While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

We claim:

1. A separating apparatus for separating a first optical fiber from a second optical fiber comprising:
    a fiber feed mechanism adapted to feed the first optical fiber and the second optical fiber; and
    a nozzle adapted to provide a displacing force on the second optical fiber;
    wherein the second optical fiber is displaced away from the first optical fiber thereby separating the second optical fiber from the first optical fiber.

2. The separating apparatus of claim 1, wherein the displacing force is directed away from the nozzle.

3. The separating apparatus of claim 1, wherein the displacing force is directed towards the nozzle.

4. The separating apparatus of claim 1, wherein the displacing force is provided by a gas stream.

5. The separating apparatus of claim 1, wherein the fiber feed mechanism is further adapted to selectively feed the first optical fiber and the second optical fiber independently of each other.

6. The separating apparatus of claim 5, further including a separation mechanism positioned a spaced distance from the fiber feed mechanism in a manner that the nozzle is positioned between the fiber feed mechanism and the separation mechanism, the separation mechanism including a first guide and a second guide spaced apart from one another, wherein the first and second guides receive the first and second optical fibers respectively.

7. The separating apparatus of claim 6, further including a guide separator between the first guide and the second guide.

8. The separating apparatus of claim 6, wherein the displacing force is exerted on a tip portion of the second optical fiber prior to the second optical fiber being received in the second guide.

9. The separating apparatus of claim 8, wherein the nozzle is positioned proximate to the separation mechanism in a manner that the displacing force displaces the tip of the second optical fiber towards the second guide to allow insertion of the second optical fiber into the second guide.

10. The separating apparatus of claim 9, further comprising a deflector plate positioned to limit the displacement of the tip of the second optical fiber.

11. The separating apparatus of claim 10, wherein the deflector plate includes a vent opening.

12. The separating apparatus of claim 11, wherein the vent opening is a plurality of through holes in the deflector plate.

13. The separating apparatus of claim 10, wherein the deflector plate is further adapted to guide the tip of the second optical fiber into the second guide.

14. The separating apparatus of claim 13, wherein the deflector plate includes a concave surface.

15. The separating apparatus of claim 5, further including a retainer wherein a first segment of the first optical fiber and a second segment of the second optical fiber are retained between the fiber feed mechanism and the retainer, length of at least the second segment being extendible by feeding additional length of the second optical fiber via the fiber feed mechanism.

16. The separating apparatus of claim 15, wherein the retainer is a clamp mechanism having a first clamp pad and a second clamp pad, at least one of the first and second clamp pads being transversely displaceable relative to the other to allow clamping of the first optical fiber and the second optical fiber thereinbetween.

17. The separating apparatus of claim 16, wherein the first clamping pad includes an offset extension that extends beyond an edge of the second clamp pad in a manner to predispose the second segment of the second optical fiber away from the offset extension when the second optical fiber is clamped in the clamp mechanism and extended via the fiber feed mechanism.

18. The separating apparatus of claim 17, wherein the displacing force acts on a mid portion of the second segment as the second optical fiber is extended via the fiber feed mechanism.

19. A method of separating a first optical fiber from a second optical fiber comprising the steps of:

provinding a fiber feed mechanism adapted to feed the first optical fiber and the second optical fiber in a manner that the first optical fiber and the second optical fiber are parallel to one another; and exerting a displacing force on the second optical fiber to physically displace the second optical fiber away from the first optical fiber to thereby separate the second optical fiber from the first optical fiber.

20. The method of claim 19, wherein the displacing force is provided by impinging a gas stream on the second optical fiber.

21. The method of claim 19, wherein the fiber feed mechanism is further adapted to selectively feed the first optical fiber and the second optical fiber independent of each other.

22. The method of claim 19, further including the step of inserting the first optical fiber into a first guide and inserting the second optical fiber into a second guide, the first guide being spaced apart from the second guide.

23. The method of claim 22, further including the step of displacing a tip portion of the second optical fiber towards the second guide prior to the step of inserting the second optical fiber into the second guide.

24. The method of claim 23, further including the steps of inserting the first optical fiber into the first guide before exerting the displacing force on the tip portion of the second optical fiber.

25. The method of claim 24, further including the step of limiting displacement of the tip of the second optical fiber by providing a deflector plate that limits physical displacement of the tip of the second optical fiber.

26. The method of claim 19, further including the steps of retaining the first optical fiber and the second optical fiber in a manner to provide a first segment of the first optical fiber and a second segment of the second optical fiber, and extending length of at least the second segment by feeding additional length of the second optical fiber via the fiber feed mechanism.

27. The method of claim 26, wherein the step of retaining the first optical fiber and the second optical fiber are attained by a clamp mechanism, the clamp mechanism including a first clamp pad and a second clamp pad, at least one of the first clamp pad and the second clamp pad being transversely displaceable relative to the other to allow clamping of the first optical fiber and the second optical fiber thereinbetween.

28. The method of claim 27, further including the step of providing the displacement force on a mid portion of the second segment as the second segment is extended via the fiber feed mechanism.

29. The method of claim 28, further including the step of maintaining the extended second segment away from the first segment by continually exerting the displacing force on the mid portion of the second segment.

30. The method of claim 27, wherein the first clamping pad includes an offset extension that extends beyond an edge of the second clamp pad in a manner to predispose the second segment of the second optical fiber away from the offset extension when the second optical fiber is clamped in the clamp mechanism.

* * * * *